US011299273B2

(12) United States Patent
Dowty et al.

(10) Patent No.: US 11,299,273 B2
(45) Date of Patent: Apr. 12, 2022

(54) CONTOURED PASSENGER SEAT PRIVACY SHELL SHAPE OF AIRCRAFT PASSENGER COMPARTMENT SUITES

(71) Applicant: B/E Aerospace, Inc., Winston-Salem, NC (US)

(72) Inventors: Mark B. Dowty, Rural Hall, NC (US); Glenn A. Johnson, Rural Hall, NC (US); Adil Mumdood Ali, Newbury Park, CA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 279 days.

(21) Appl. No.: 16/744,653

(22) Filed: Jan. 16, 2020

(65) Prior Publication Data
US 2021/0221514 A1 Jul. 22, 2021

(51) Int. Cl.
*B64D 11/06* (2006.01)
*B64D 11/00* (2006.01)

(52) U.S. Cl.
CPC ...... *B64D 11/0604* (2014.12); *B64D 11/0606* (2014.12); *B64D 11/0641* (2014.12); *B64D 11/0601* (2014.12); *B64D 11/064* (2014.12); *B64D 11/0605* (2014.12); *B64D 11/0643* (2014.12); *B64D 2011/0046* (2013.01)

(58) Field of Classification Search
CPC ............ B64D 11/0604; B64D 11/0606; B64D 11/064; B64D 11/0641
See application file for complete search history.

(56) References Cited

U.S. PATENT DOCUMENTS

| 6,692,069 | B2 | 2/2004 | Beroth et al. |
| 7,798,446 | B2 | 9/2010 | Park |
| 8,936,214 | B2 | 1/2015 | Foucher et al. |

(Continued)

FOREIGN PATENT DOCUMENTS

| AU | 2002355368 B2 | 2/2003 |
| GB | 2575058 A | 1/2020 |

(Continued)

OTHER PUBLICATIONS

Extended Search Report for European Application No. 21151818.8 dated May 21, 2021, 7 pages.

*Primary Examiner* — Timothy D Collins
*Assistant Examiner* — Justin Michael Heston
(74) *Attorney, Agent, or Firm* — Suiter Swantz pc llo

(57) ABSTRACT

An aircraft passenger compartment suite may include a privacy shell element proximate to an aircraft seat installed within the aircraft passenger compartment suite. The privacy shell element may include a first section configured to conform to a primary section of the aircraft seat, and a second section configured to conform to an auxiliary section of the aircraft seat. The privacy shell element may include a first profile configured to conform with the aircraft seat when the aircraft seat is in a first position, and a second profile configured to conform with the aircraft seat when the aircraft seat is in a second position. The second profile of the privacy shell element may be configured to occupy a greater amount of passenger aircraft living space surrounding the aircraft passenger compartment suite than an amount of passenger aircraft living space occupied by the first profile of the privacy shell element.

15 Claims, 7 Drawing Sheets

(56) References Cited

U.S. PATENT DOCUMENTS

| | | |
|---|---|---|
| 9,022,320 B2 | 5/2015 | Wallace et al. |
| 9,266,613 B2 | 2/2016 | Henshaw et al. |
| 9,403,597 B2 | 8/2016 | Ferry et al. |
| 9,828,100 B2 | 11/2017 | Wyss |
| 2003/0085597 A1 | 5/2003 | Ludeke et al. |
| 2017/0129611 A1 | 5/2017 | Morgan |
| 2017/0240283 A1 | 8/2017 | Dowty |
| 2018/0281964 A1* | 10/2018 | Carlioz ............. B64D 11/0604 |
| 2019/0092475 A1 | 3/2019 | Carlioz et al. |
| 2019/0241269 A1 | 8/2019 | Martin et al. |
| 2019/0308733 A1 | 10/2019 | O'Neill et al. |

FOREIGN PATENT DOCUMENTS

| | | | |
|---|---|---|---|
| HK | 1154831 A | 9/2012 | |
| NZ | 334165 A | 6/1999 | |
| WO | 2014199303 A1 | 12/2014 | |
| WO | WO-2015081496 A1 * | 6/2015 | ......... B64D 11/0601 |

* cited by examiner

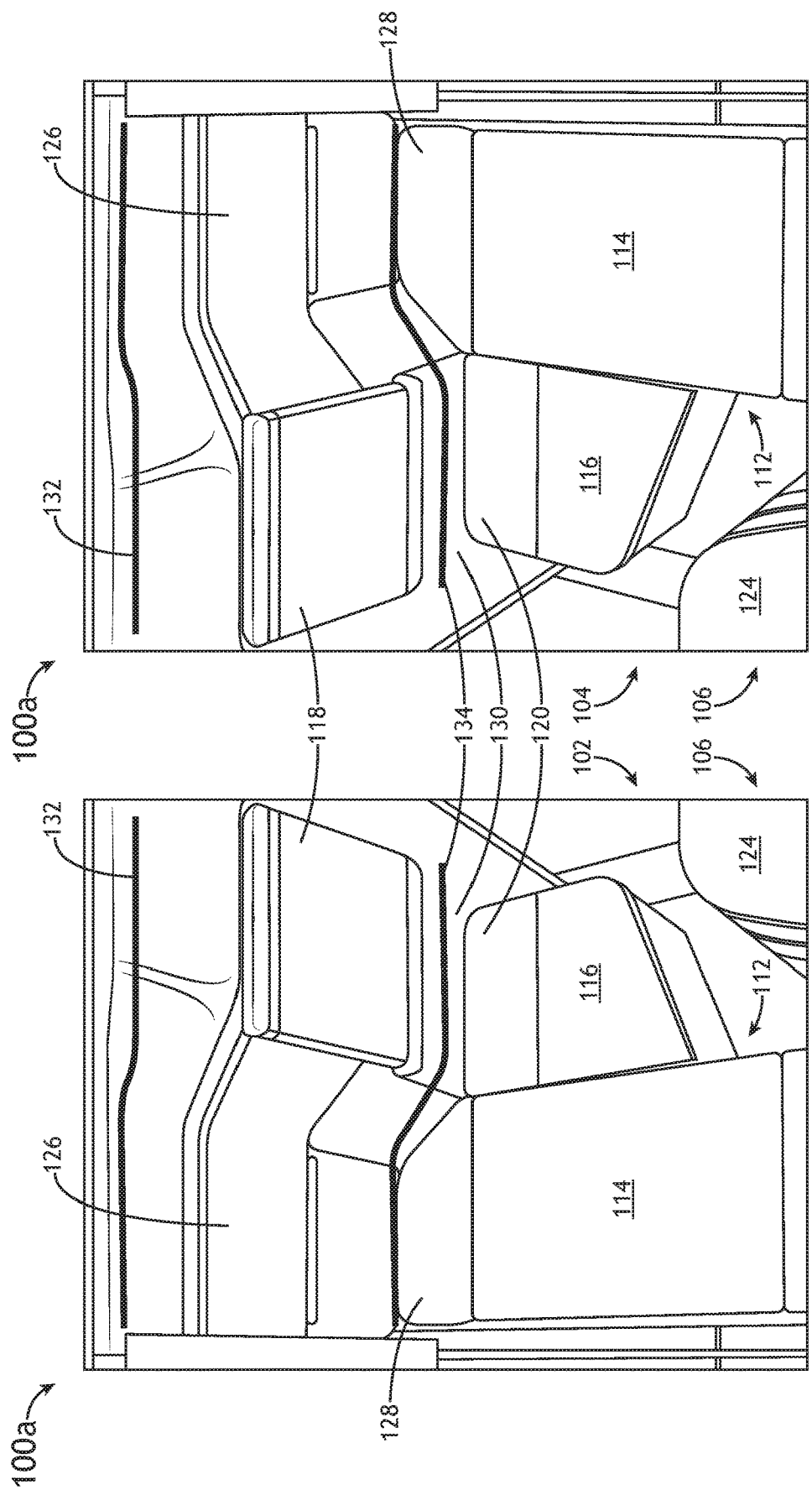

CONTOURED PASSENGER SEAT PRIVACY SHELL SHAPE OF AIRCRAFT PASSENGER COMPARTMENT SUITES

BACKGROUND

In commercial transportation vehicles such as passenger aircraft, an aircraft passenger compartment suite may include one or more aircraft seats. Privacy shell elements of the aircraft passenger compartment suite may be designed to accept a portion of the one or more aircraft seats. The privacy shell elements may be curved, which take up living space in the passenger aircraft outside of the aircraft passenger compartment suite.

SUMMARY

An aircraft passenger compartment suite is disclosed, in accordance with one or more embodiments of the disclosure. The aircraft passenger compartment suite may include a privacy shell element proximate to an aircraft seat installed within the aircraft passenger compartment suite. A first section of the privacy shell element may be configured to conform to a primary section of the aircraft seat. A second section of the privacy shell element may be configured to conform to an auxiliary section of the aircraft seat. The privacy shell element may include a first profile configured to conform with the aircraft seat when the aircraft seat is in a first position. The privacy shell element may include a second profile configured to conform with the aircraft seat when the aircraft seat is in a second position. The second profile of the privacy shell element may be configured to occupy a greater amount of passenger aircraft living space surrounding the aircraft passenger compartment suite than an amount of passenger aircraft living space occupied by the first profile of the privacy shell element.

In some embodiments, the first position may include an upright position.

In some embodiments, the primary section of the aircraft seat and the auxiliary section of the aircraft seat may include a wide seating area when the aircraft seat is in the upright position.

In some embodiments, the primary section of the aircraft seat may be configured for a first passenger in the aircraft passenger compartment suite when the aircraft seat is in the upright position.

In some embodiments, the auxiliary section of the aircraft seat may be configured for a second passenger in the aircraft passenger compartment suite when the aircraft seat is in the upright position.

In some embodiments, the first section of the privacy shell element may be configured to conform to a seat back of the primary section of the aircraft seat when the aircraft seat is in the upright position. The second section of the privacy shell element may be configured to conform to a seat back of the auxiliary section of the aircraft seat when the aircraft seat is in the upright position.

In some embodiments, the first profile of the privacy shell element may include a first flat surface configured to conform to the seat back of the primary section of the aircraft seat when the aircraft seat is in the upright position, the first profile of the privacy shell element may include a second flat surface configured to conform to the seat back of the auxiliary section of the aircraft seat when the aircraft seat is in the upright position.

In some embodiments, the second position may include a lie-flat position.

In some embodiments, the primary section of the aircraft seat and the auxiliary section of the aircraft seat may include a wide lie-flat area when the aircraft seat is in the lie-flat position.

In some embodiments, the primary section of the aircraft seat and the auxiliary section of the aircraft seat may be configured for a passenger in the aircraft passenger compartment suite when the aircraft seat is in the lie-flat position.

In some embodiments, the first section of the privacy shell element may be configured to conform to a headrest of the primary section of the aircraft seat when the aircraft seat is in the lie-flat position. The second section of the privacy shell element may be configured to conform to an edge of a seat back of the auxiliary section of the aircraft seat when the aircraft seat is in the lie-flat position.

In some embodiments, the second profile of the privacy shell element may include a notch configured to conform to the headrest of the primary section of the aircraft seat when the aircraft seat is in the lie-flat position, the second profile of the privacy shell element may include a surface configured to conform to the seat back of the auxiliary section of the aircraft seat when the aircraft seat is in the lie-flat position. The notch may be configured to occupy the greater amount of passenger aircraft living space surrounding the aircraft passenger compartment suite than the amount of passenger aircraft living space occupied by the surface configured to conform to the seat back of the auxiliary section of the aircraft seat.

In some embodiments, a portion of the auxiliary section of the aircraft seat may be coupled to the privacy shell element when the auxiliary section of the aircraft seat transitions between the upright position and the lie-flat position.

In some embodiments, the aircraft seat may be configured to be positioned within a reclined position. The aircraft seat may be configured to transition from the upright position to the lie-flat position through the reclined position.

An aircraft passenger compartment suite system is disclosed, in accordance with one or more embodiments of the disclosure. The aircraft passenger compartment suite system may include a first aircraft passenger compartment suite. The first aircraft passenger compartment suite may include a first privacy shell element proximate to a first aircraft seat installed within the first aircraft passenger compartment suite. A first section of the first privacy shell element may be configured to conform to a primary section of the first aircraft seat. A second section of the first privacy shell element may be configured to conform to an auxiliary section of the first aircraft seat. The first privacy shell element may include a first profile configured to conform with the first aircraft seat when the first aircraft seat is in a first position. The first privacy shell element may include a second profile configured to conform with the first aircraft seat when the first aircraft seat is in a second position. The second profile of the first privacy shell element may be configured to occupy a greater amount of passenger aircraft living space surrounding the first aircraft passenger compartment suite than an amount of passenger aircraft living space occupied by the first profile of the first privacy shell element. The aircraft passenger compartment suite system may include a second aircraft passenger compartment suite. The second aircraft passenger compartment suite may include a second privacy shell element proximate to a second aircraft seat installed within the second aircraft passenger compartment suite. A first section of the second privacy shell element may be configured to conform to a primary section of the second aircraft seat. A second section of the second privacy shell element may be configured to conform to an auxiliary section of the second aircraft seat. The second privacy shell element may include a first profile configured to conform with the second aircraft seat when the second aircraft seat is in a first position. The second privacy shell element may include a second profile configured to conform with the aircraft seat when the aircraft seat is in a second position. The second profile of the second privacy shell element may be configured to occupy a greater amount of passenger aircraft living space surrounding the second aircraft passenger compartment suite than an amount of passenger aircraft living space occupied by the first profile of the second privacy shell element. The first aircraft passenger compartment suite may be positioned proximate to the second aircraft passenger compartment suite within the passenger aircraft living space. The first privacy shell element of the first aircraft passenger compartment suite may be configured to engage with the second privacy shell element of the second aircraft passenger compartment suite.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3C illustrates an aircraft passenger compartment suite including a contoured passenger seat privacy shell shape, in accordance with one or more embodiments of the disclosure;

FIG. 3D illustrates an aircraft passenger compartment suite including a contoured passenger seat privacy shell shape, in accordance with one or more embodiments of the disclosure.

DETAILED DESCRIPTION OF THE INVENTION

Figure 1:
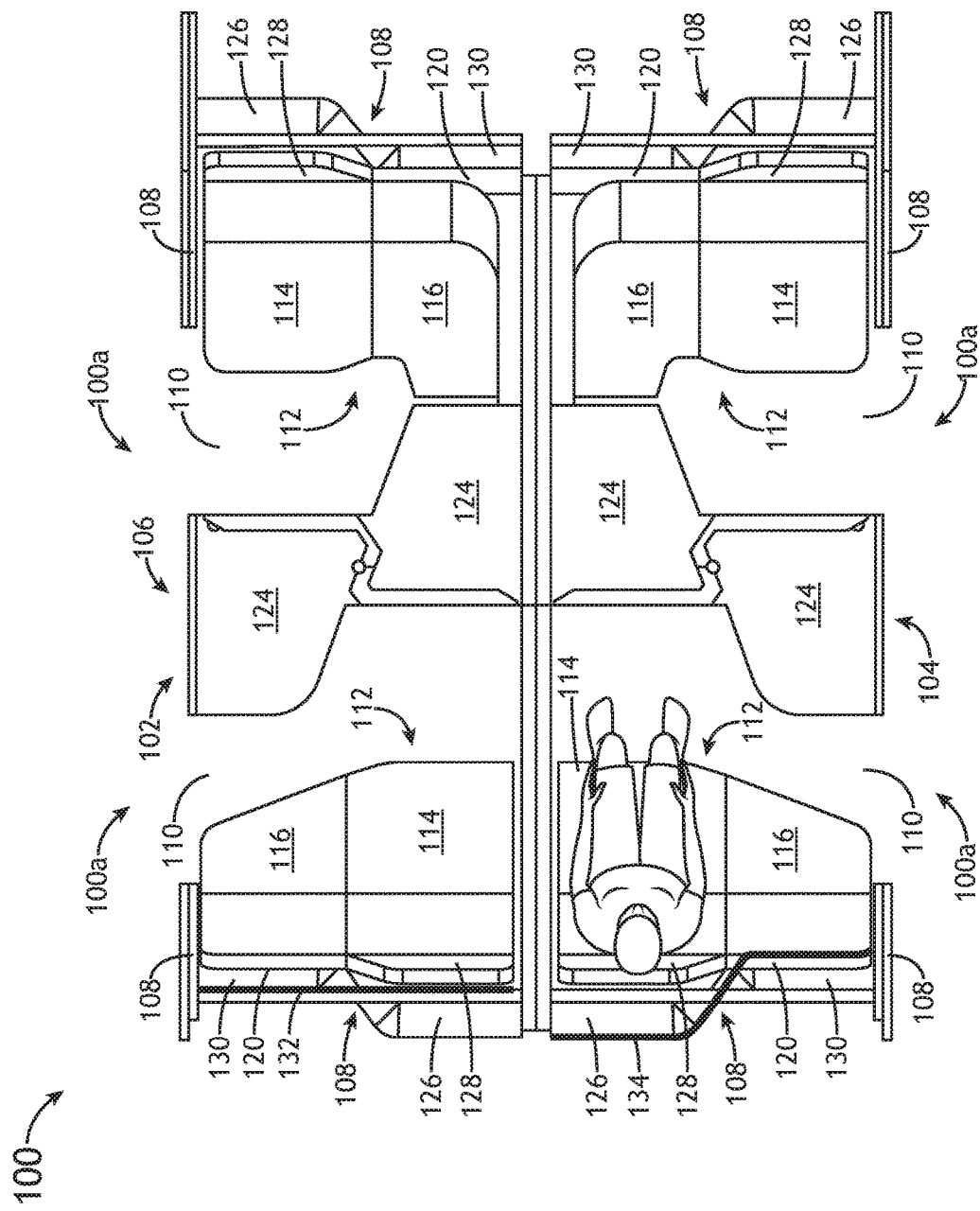
FIG. 1 illustrates an aircraft passenger compartment suite including a contoured passenger seat privacy shell shape, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-4 generally illustrate an aircraft passenger compartment suite including a contoured passenger seat privacy shell shape, in accordance with one or more embodiments of the disclosure.

In commercial transportation vehicles such as passenger aircraft, an aircraft passenger compartment suite may include one or more aircraft seats. Privacy shell elements of the aircraft passenger compartment suite may be designed to conform to the one or more aircraft seats. To allow for a more compact configuration of the aircraft passenger compartment suites within the passenger aircraft, an amount of unused living space within the passenger aircraft should be minimized. As such, it would be beneficial to provide an aircraft passenger compartment suite including a contoured passenger seat privacy shell shape that minimizes the amount of unused living space within the passenger aircraft.

FIGS. 1-3D illustrate an aircraft passenger compartment suite 100, in accordance with one or more embodiments of the disclosure.

The aircraft passenger compartment suite 100 may include one or more sides. For example, the aircraft passenger compartment suite 100 may include a side 102 and a side 104 separated by a privacy divider 106. The aircraft passenger compartment suite 100 may include one or more passenger compartments 100a. For example, the aircraft passenger compartment suite 100 may include one or more passenger compartments 100a within the side 102 and/or one or more passenger compartments 100a within the side 104.

The aircraft passenger compartment suite 100 may include a privacy shell with one or more privacy shell elements 108. The privacy shell may include an opening 110 within the one or more privacy shell elements 108 into the aircraft passenger compartment 100a. The aircraft passenger compartment suite 100 may include a door for the opening 110. For example, the door may swing or slide into an open position against a privacy shell element 108. By way of another example, a privacy shell element 108 may be at least partially hollow, and the door may be slid into a cavity defined in the one or more privacy shell elements 108.

The aircraft passenger compartment 100a may include one or more aircraft seats 112. For example, the aircraft passenger compartment 100a may include one aircraft seat 112. By way of another example, the aircraft passenger compartment 100a may include two aircraft seats 112. An aircraft seat 112 may include one or more aircraft seat sections. For example, the aircraft seat 112 may include a primary section 114 and an auxiliary section 116. By way of another example, the aircraft seat 112 may include a single section. Generally, the aircraft seat 112 may include any number of sections.

The aircraft seat 112 may be translatable (e.g., trackable or slidable). The aircraft seat 112 may be rotatable about an axis cross-wise through the aircraft seat 112 into a position including, but not limited to, an upright or raised position, one or more reclined positions, and/or a bed or lie-flat position. The aircraft seat 112 may be rotatable about an axis (e.g., swivelable). The aircraft seat 112 may be fully positionable between the outer limits of motion as defined by the moveable components of the aircraft seat 112, and/or other monuments of the aircraft passenger compartment 100a. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 112 may be actuatable (e.g., translatable and/or rotatable) from the TTOL position to a non-TTOL position, and/or vice versa.

Referring now to FIG. 1, the aircraft seat 112 may be in an upright position. The primary section 114 and the auxiliary section 116 of the aircraft seat 112 may form a wide seating area or surface when the aircraft seat 112 is in the upright position. The wide seating area or surface may be configured to seat one or more passengers. For example, the primary section 114 may be configured to seat a passenger occupying the aircraft passenger compartment suite 100. By way of another example, the auxiliary section 116 may be configured to seat a guest passenger when the aircraft seat 112 is in the upright position. It is noted herein the increased width of the aircraft seat 112 may provide for the aircraft passenger compartment suite 100 to be used as a shared, social environment in addition to usage by the passenger occupying the aircraft passenger compartment suite 100.

Figure 2A:
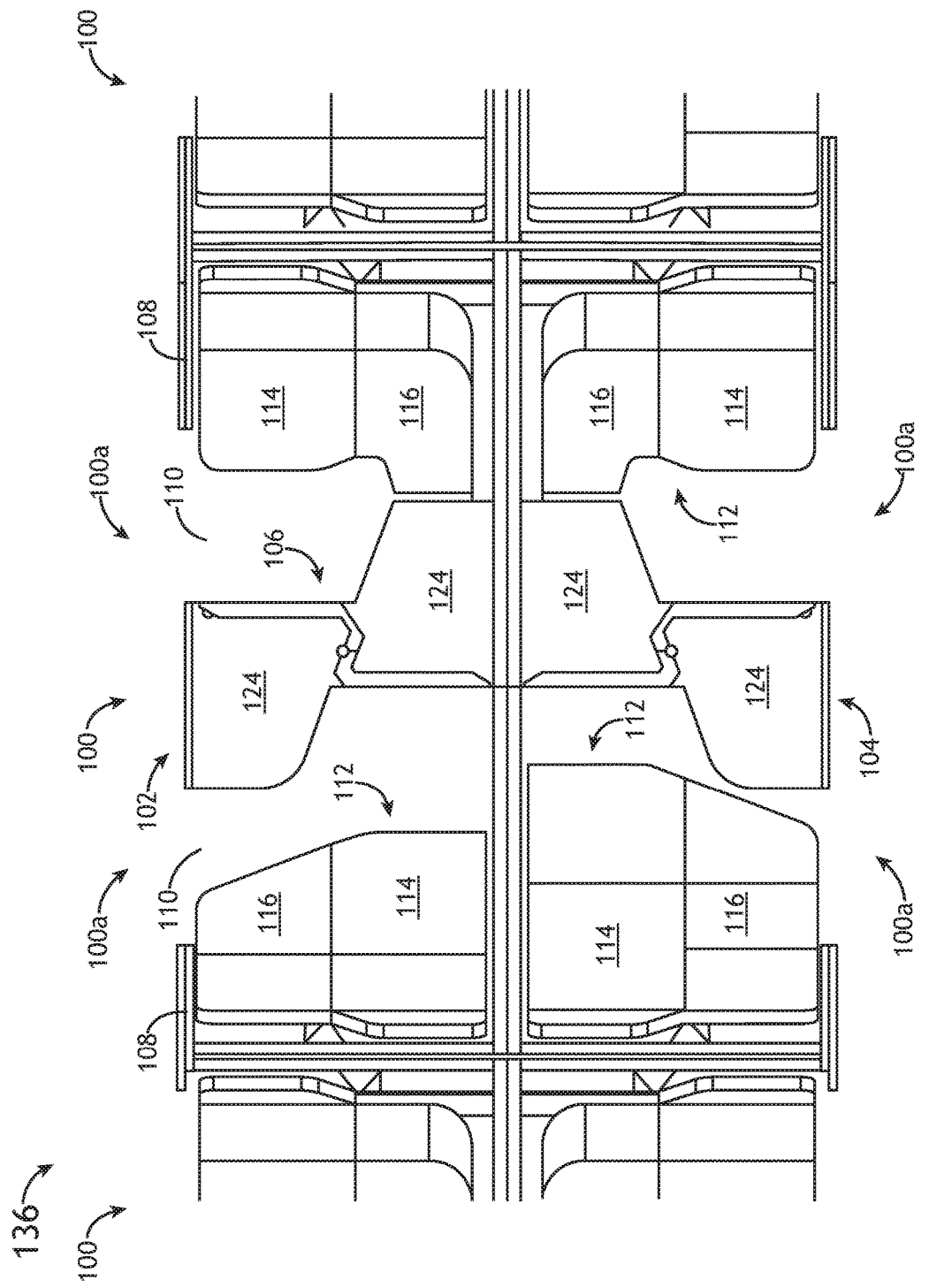
FIG. 2A illustrates aircraft passenger compartment suites including a contoured passenger seat privacy shell shape, in accordance with one or more embodiments of the disclosure.
Figure 2B:
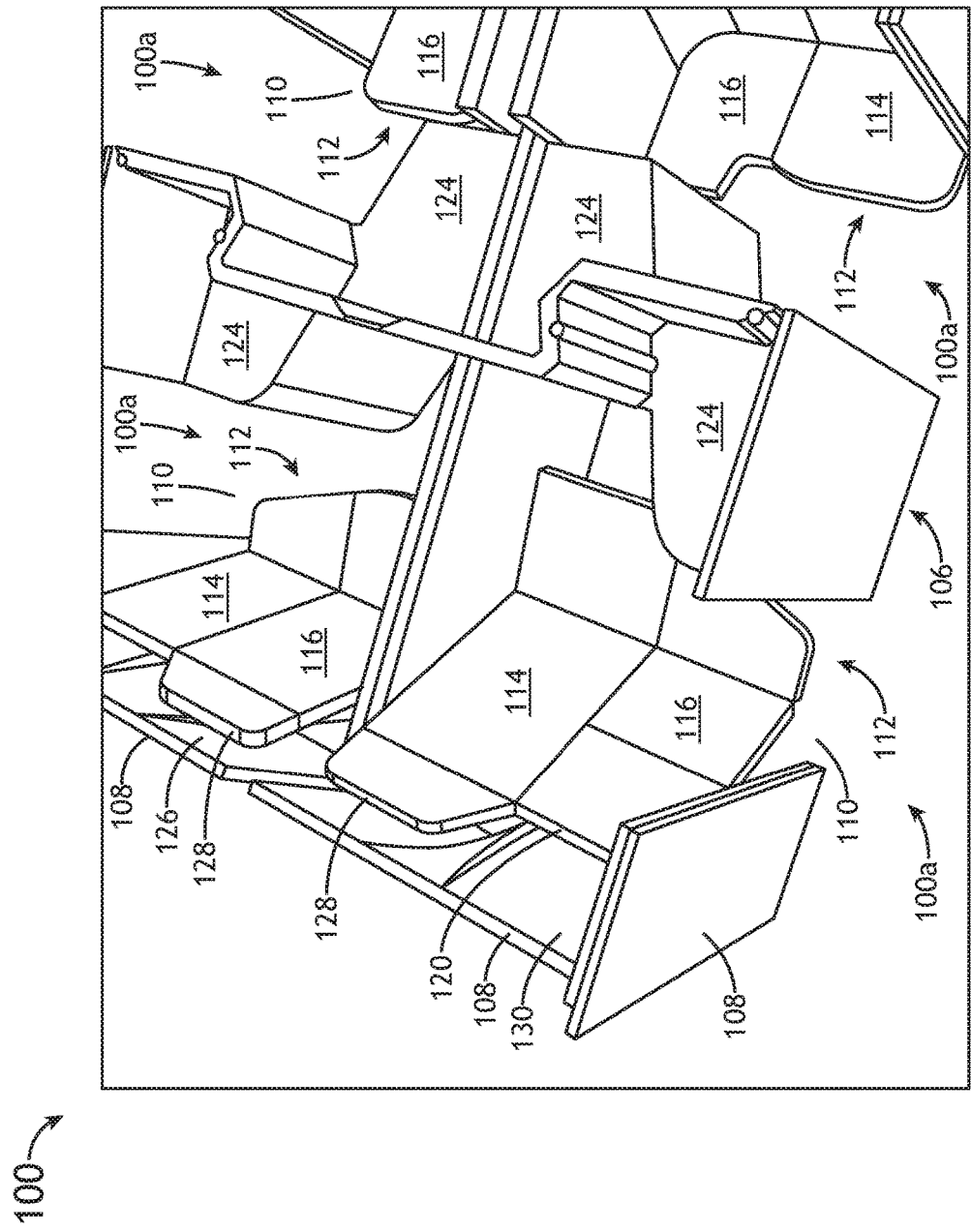
FIG. 2B illustrates an aircraft passenger compartment suite including a contoured passenger seat privacy shell shape, in accordance with one or more embodiments of the disclosure.
Figure 3A:
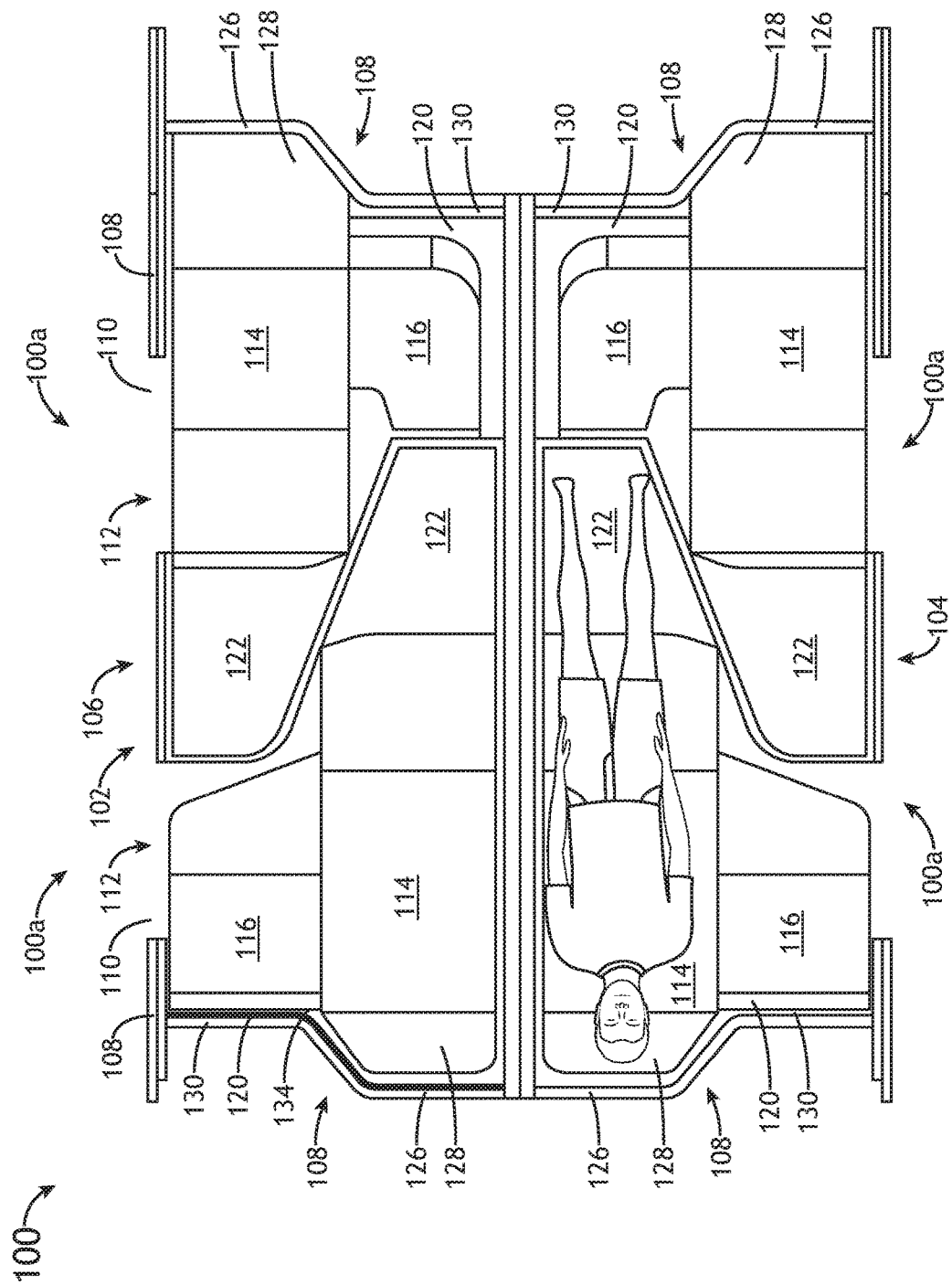
FIG. 3A illustrates an aircraft passenger compartment suite including a contoured passenger seat privacy shell shape, in accordance with one or more embodiments of the disclosure.
Figure 3B:
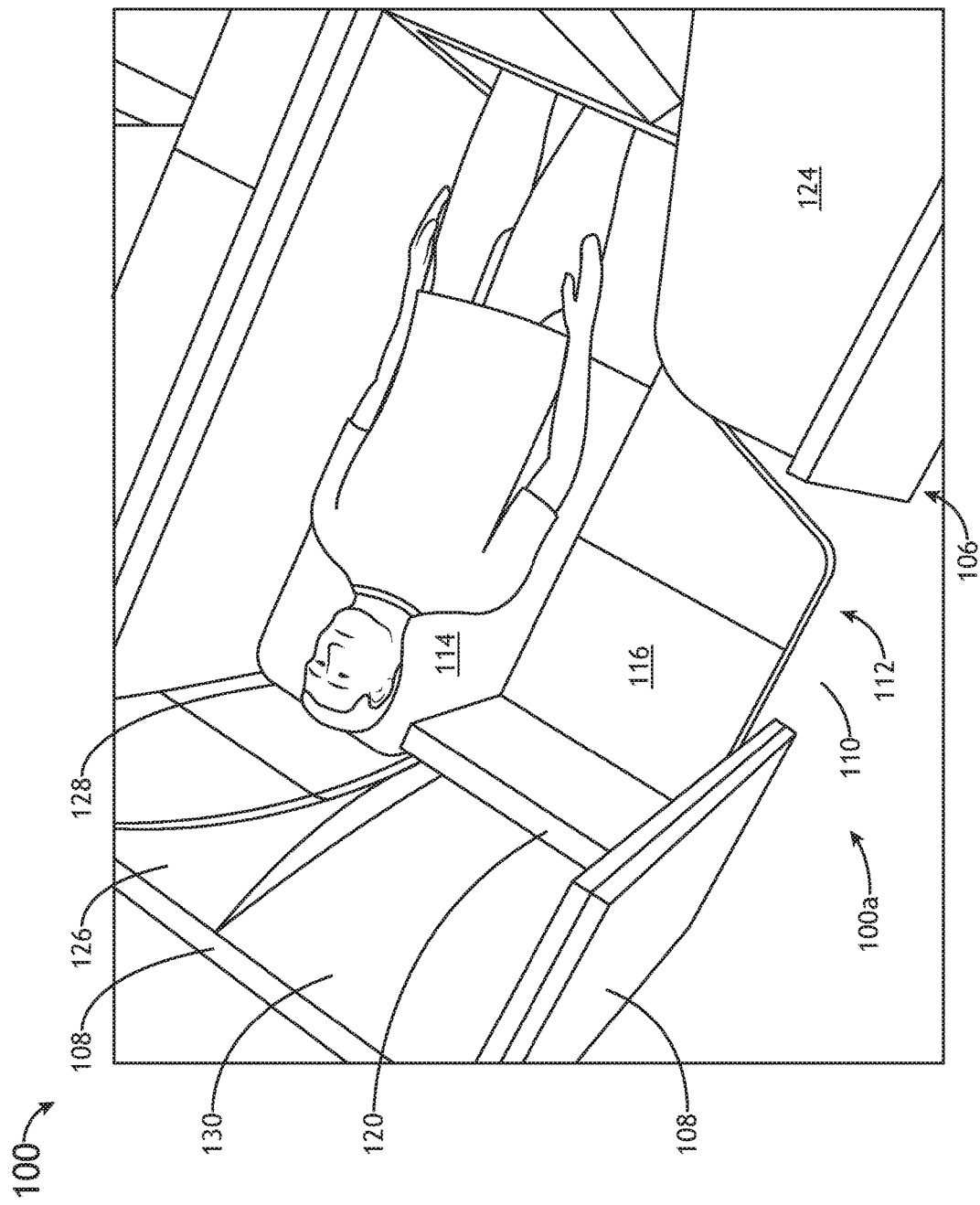
FIG. 3B illustrates an aircraft passenger compartment suite including a contoured passenger seat privacy shell shape, in accordance with one or more embodiments of the disclosure.

Referring now to FIGS. 2A and 2B, the aircraft seat 112 may be in a reclined position. For example, the primary section 114 of the aircraft seat 112 may form a reclined seating surface when the aircraft seat 112 is in the reclined position. By way of another example, the primary section 114 and the auxiliary section 116 of the aircraft seat 112 may form a wide reclined seating area or surface when the aircraft seat 112 is in the reclined position. Where the primary section 114 and the auxiliary section 116 may form the wide reclined seating area or surface, an actuation of the auxiliary section 116 may be dependent on an actuation of the primary section 114. It is noted herein, however, that the actuation of the auxiliary section 116 may be independent of the actuation of the primary section 114.

Referring now to FIGS. 3A-3D, the aircraft seat 112 may be a lie-flat position. For example, the primary section 114 of the aircraft seat 112 may form a lie-flat area or surface when the aircraft seat 112 is in the lie-flat position. By way of another example, the primary section 114 and the auxiliary section 116 of the aircraft seat 112 may form a wide lie-flat area or surface when the aircraft seat 112 is in the lie-flat position. For instance, the wide lie-flat area or surface may provide increased width for portions of a passenger's upper body (e.g., torso, arms, shoulders, head, or the like). In addition, the wide lie-flat area or surface may provide an area to be used as a surface for the passenger's belongings (e.g., similar to a nightstand or end table). Where the primary section 114 and the auxiliary section 116 may form the wide bed area or surface, an auxiliary seatback portion 118 of the auxiliary section 116 (e.g., a cushion, or other portion of the auxiliary section 116) may remain coupled or attached to the privacy shell element 108 (e.g., as illustrated in at least FIGS. 3C and 3D) It is noted herein, however, that the entirety of the auxiliary section 116 may actuate into the reclined position (e.g., as illustrated in at least FIG. 3B).

As illustrated in at least FIGS. 3C and 3D, a gap may exist between an auxiliary seat base portion 120 of the auxiliary section 116 of the aircraft seat 112 coupled to the primary section 114 of the aircraft seat 112 (e.g., an air gap, a gap configured to hold a pillow for a passenger when the aircraft seat 112 is in the lie-flat position) and the auxiliary seatback portion 118 of the auxiliary section 116 of the aircraft seat 112. It is noted herein the gap may represent a spacing between the auxiliary seat base portion 120 and the auxiliary seatback portion 118 of the auxiliary section 116 of the aircraft seat 112 (e.g., a spacing where a portion of a privacy shell element 108 be may observed). In addition, it is noted herein the gap may contribute to the wide lie-flat area or surface providing increased width for portions of a passenger's upper body (e.g., torso, arms, shoulders, head, or the like).

The primary section 114 may be proximate to an ottoman 122 of the aircraft passenger compartment suite 100 when in the lie-flat position, such that the aircraft seat 112 and the ottoman 122 may form the lie-flat surface when the aircraft seat 112 and the ottoman 122 are each in a lie-flat position.

The ottoman 122 may be positioned underneath a monument 124 of the privacy divider 106. For example, a monument 124 may include, but is not limited to, a side stand, a tray or table, or the like. Where the monument 124 includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted herein, however, that the tray or table may be actuatable (e.g., may extend a select distance from a stowed position to an extended position proximate to a passenger).

The ottoman 122 may be positioned within a footwell of the aircraft passenger compartment suite 100. For instance, one or more dimensions of the footwell may be changed by transitioning the aircraft seat 112 between an upright position, a reclined position, and/or the lie-flat position. It is noted herein that a portion of the ottoman 122 may be actuatable (e.g., along a set of tracks or linear rails) to a position outside of the footwell.

The ottoman 122 may be configured to translate and/or rotate about an axis through a sidewall of the ottoman to point a top surface to a passenger occupying the aircraft seat 112. For example, where the ottoman 122 may be configured to both translate and rotate, the ottoman 122 may be configured to independently rotate and/or translate. By way of another example, where the ottoman 122 may be configured to both translate and rotate, a rotation may prevent further translation until the ottoman 122 is returned to a select position and/or a translation may prevent further rotation until the ottoman 122 is returned to a select position.

It is noted herein, however, the aircraft seat 112 and/or the ottoman 122 may be limited to an upright position and/or one or more reclined positions. In addition, it is noted herein the aircraft seat 112 may be the sole component forming a bed when the aircraft seat 112 is in a lie-flat position. Therefore, the above description should not be interpreted as a limitation on the present disclosure but merely an illustration.

A privacy shell element 108 proximate to the aircraft seat 112 may be configured to conform to at least a portion of the aircraft seat 112. The privacy shell element 108 may include a first section 126 configured to conform to a first portion 128 of the primary section 114 of the aircraft seat 112 (e.g., a headrest, a seat back cushion, or the like). The privacy shell element 108 may include a second section 130 configured to conform to a portion of the auxiliary seat base portion 120 of the auxiliary section 116 of the aircraft seat 112 (e.g., a headrest, a seat back cushion, or the like of the auxiliary seat base portion 120).

For example, the first section 126 may include a surface configured to conform to a surface of a seat back cushion 128 of the primary section 114 of the aircraft seat 112 when the aircraft seat 112 is in the upright position. By way of another example, the second section 130 may include a surface configured to conform to a surface of a seat back cushion of the auxiliary seat base portion 120 of the auxiliary section 116 of the aircraft seat 112 when the aircraft seat 112 is in the upright position.

By way of another example, the first section 126 may include a notch configured to conform to (e.g., receive) a headrest 128 of the primary section 114 of the aircraft seat 112 when the aircraft seat 112 is in a lie-flat position (and/or is transitioning between the reclined position and the lie-flat position). By way of another example, the second section 130 may include a surface configured to conform to an edge of a seat back cushion of the auxiliary seat base portion 120 of the auxiliary section 116 of the aircraft seat 112 when the aircraft seat 112 is in the lie-flat position (and/or is transitioning between the reclined position and the lie-flat position).

The privacy shell element 108 may extend into an exterior living space of a passenger aircraft a select amount. For example, the privacy shell element 108 may include a three-dimensional profile 132 configured to conform to the aircraft seat 112 in the upright position (e.g., is proximate to the seat back cushion 128 of the primary section 114 of the aircraft seat 112 and/or the seatback cushion 118 of the auxiliary section 116 of the aircraft seat 112). For instance, the profile 132 may be at head height in the upright position when viewed from vertical. By way of another example, the privacy shell element 108 may include a three-dimensional profile 134 configured to conform to the aircraft seat 112 in the lie-flat position (e.g., is configured to accept at least a portion of the headrest of the primary section 114 of the aircraft seat 112 and/or an edge of the seatback cushion 118 of the auxiliary section 116 of the aircraft seat 112). For instance, the profile 134 may be at lie-flat height when viewed from vertical.

It is noted herein the profile 134 may extend further into the living space exterior to the aircraft passenger compartment suite 100 than an amount the profile 132 may extend into the living space, due to the need to accept at least a portion of the headrest of the primary section 114 of the aircraft seat 112. In this regard, the profile 134 may occupy more of the living space exterior to the aircraft passenger compartment suite 100 at bed height than the profile 134 may occupy at head height in the upright position.

The first section 126 and/or the second section 130 of the privacy shell element 108 may be defined by straight-line and/or rectilinear forms (e.g., as illustrated in at least FIGS. 1, 3A, 3C, and 3D), as opposed to curved or rounded forms. The straight-line and/or rectilinear forms may allow for a first section 126 of a privacy shell element 108 of a first aircraft passenger compartment suite 100 to engage (e.g., receive, interlock, or the like) with a second section 130 of a privacy shell element 108 of a second (e.g., adjacent) aircraft passenger compartment suite 100, where multiple aircraft passenger compartment suites 100 are installed within a passenger aircraft (e.g., as illustrated in at least FIG. 2A).

It is noted herein the complementary straight-line and/or rectilinear forms of the first section 126 of the privacy shell element 108 of the first aircraft passenger compartment suite 100 and the second section 130 of the privacy shell element 108 of the second (e.g., adjacent) aircraft passenger compartment suite 100 may allow for the multiple aircraft passenger compartment suites 100 to be installed within the passenger aircraft in a more compact arrangement.

In addition, it is noted herein the complementary straight-line and/or rectilinear forms of the first section 126 of the privacy shell element 108 of the first aircraft passenger compartment suite 100 and the second section 130 of the privacy shell element 108 of the second (e.g., adjacent) aircraft passenger compartment suite 100 may allow for a reduction in the amount of passenger aircraft living space taken up by an aircraft passenger compartment suite 100, as compared to an amount of exterior living space taken up by an aircraft passenger compartment suite 100 with curved or rounded privacy shell elements 108.

In this regard, the complementary straight-line and/or rectilinear forms may provide more space for the first portion 128 (e.g., headrest 128) of the primary section 114 of the aircraft seat 112 to occupy (e.g., when the aircraft seat 112 is in a lie-flat position, as indicated by a comparison of the profile 132 and the profile 134) without overlay encroaching on the exterior living space of an adjacent aircraft passenger compartment suite 100. The complementary straight-line and/or rectilinear forms may allow for a maintaining of volume or a minimum change in volume of the aircraft passenger compartment suite 100. The complementary straight-line and/or rectilinear forms may allow for a maintaining of area or minimum change of area of a footwell and/or other active passenger space within the aircraft passenger compartment suite 100.

It is noted herein the multiple aircraft passenger compartment suites 100 may be considered an aircraft passenger compartment suite system 136 (e.g., as illustrated in at least FIG. 2A), for purposes of the present disclosure.

The aircraft passenger compartment 100a of the aircraft passenger compartment suite 100 may include one or more lights, one or more stowage compartments, and/or one or more passenger in-flight entertainment devices (IFEs). For example, the one or more IFEs may include, but are not limited to, one or more display devices.

Although embodiments of the disclosure illustrate components as being installed within and/or related to the side 102 or the side 104, it is noted herein any discussion about components installed within and/or related to the side 102 may be applied to the side 104, and vice versa. Therefore, the above description should not be interpreted as a limitation on the scope of the disclosure but merely an illustration.

Figure 4:
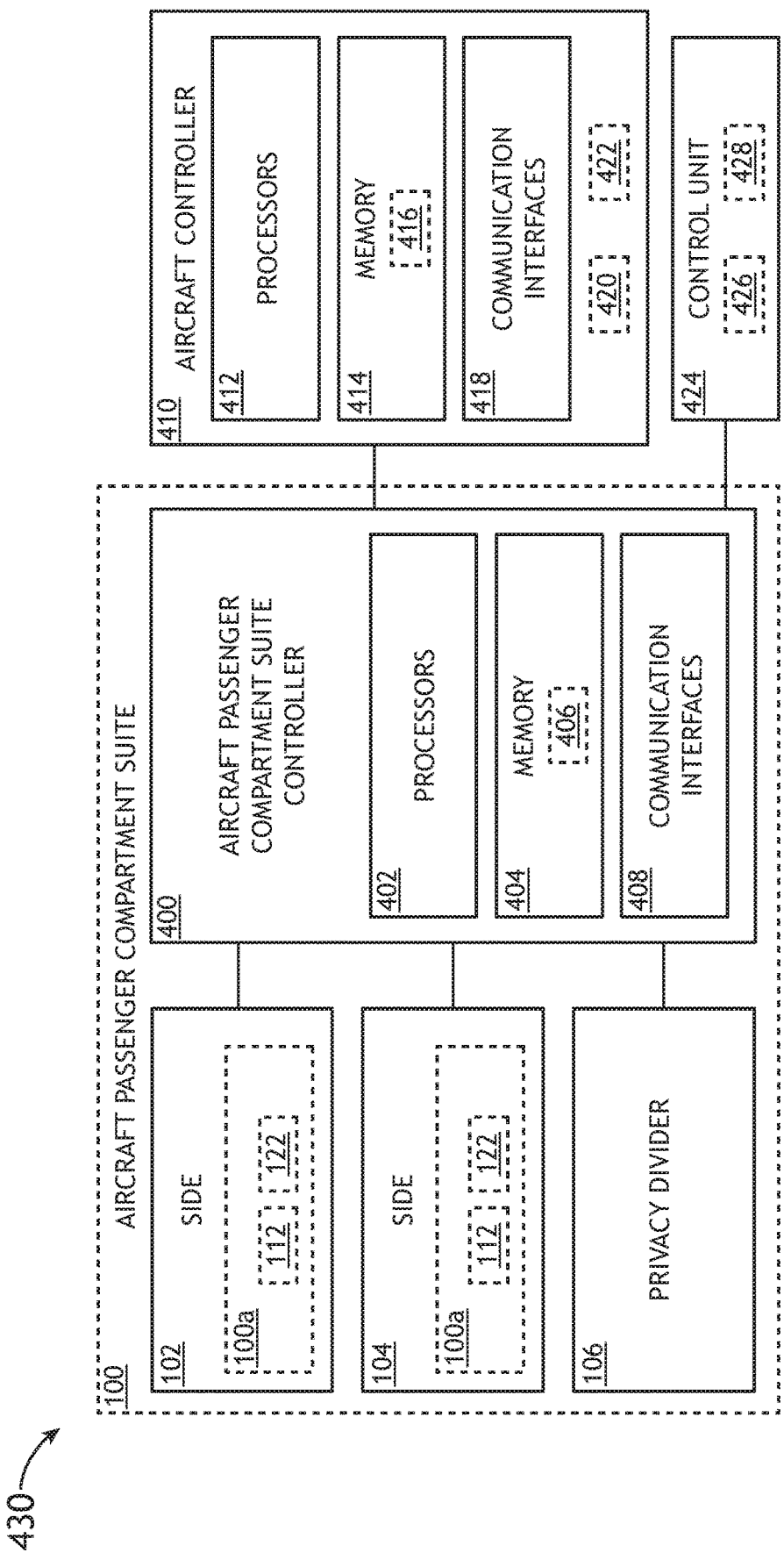
FIG. 4 illustrates a block diagram of an aircraft including an aircraft passenger compartment suite, in accordance with one or more embodiments of the disclosure.

FIG. 4 illustrates a block diagram of a passenger aircraft 430 including the aircraft passenger compartment suite 100, in accordance with one or more embodiments of the disclosure.

The passenger aircraft 430 may include one or more aircraft passenger compartment suite controllers 400 (e.g., in the aircraft passenger compartment suite 100). The one or more aircraft passenger compartment suite controllers 400 may include one or more processors 402 and memory 404. The memory 404 may store one or more sets of program instructions 406. The one or more processors 402 may be configured to execute the one or more sets of program instructions 406 to carry out one or more of the various steps described throughout the present disclosure. The one or more aircraft passenger compartment suite controllers 400 may include one or more communication interfaces 408.

The one or more aircraft passenger compartment suite controllers 400 may be coupled (e.g., physically and/or communicatively coupled) to one or more components in an aircraft passenger compartment 100a of the side 102 (e.g., the aircraft seat 112, the ottoman 122, or other components of an aircraft passenger compartment 100a of the side 102). The one or more aircraft passenger compartment suite controllers 400 may be coupled (e.g., physically and/or communicatively coupled) to one or more components in an aircraft passenger compartment 100a of the side 104 (e.g., the aircraft seat 112, the ottoman 122, or other components of an aircraft passenger compartment 100a of the side 104). The one or more aircraft passenger compartment suite controllers 400 may be coupled (e.g., physically and/or communicatively coupled) to one or more components in the privacy divider 106.

The one or more aircraft passenger compartment suite controllers 400 may transmit instructions, power, control signals, data, or the like to the one or more components in an aircraft passenger compartment 100a of the side 102, an aircraft passenger compartment 100a of the side 104, and/or the privacy divider 106. The one or more aircraft passenger compartment suite controllers 400 may receive instructions, power, control signals, data, or the like from the one or more components in an aircraft passenger compartment 100a of the side 102, an aircraft passenger compartment 100a of the side 104, and/or the privacy divider 106.

The one or more aircraft passenger compartment suite controllers 400 may be coupled (e.g., physically and/or communicatively coupled) to one or more external aircraft controllers 410. The one or more aircraft controllers 410 may include one or more processors 412 and memory 414. The memory 414 may store one or more sets of program instructions 416. The one or more processors 412 may be configured to execute the one or more sets of program instructions 416 to carry out one or more of the various steps described throughout the present disclosure. The one or more aircraft controllers 410 may include one or more communication interfaces 418.

The one or more aircraft controllers 410 may be coupled to one or more display devices 420. The one or more aircraft controllers 410 may be coupled to one or more user input devices 422.

The one or more aircraft passenger compartment suite controllers 400 may be coupled to a control unit 424. The control unit 424 may be coupled to one or more display devices 426. The control unit 424 may be coupled to one or more user input devices 428. The passenger control unit 424 may be positioned in the aircraft passenger compartment suite 100 for use by a passenger. The passenger control unit 424 may be positioned on an external surface of the aircraft passenger compartment suite 100 for use by a crew member.

It is noted herein the control unit 424 may be considered to be at least a portion of the one or more aircraft passenger compartment suite controllers 400. For example, the control unit 424 may be a component of the one or more aircraft passenger compartment suite controllers 400. By way of another example, the control unit 424 may be integrated in the one or more aircraft passenger compartment suite controllers 400. In addition, it is noted herein the control unit 424 may be considered to include and/or be a passenger seat control unit, for purposes of the present disclosure.

Passengers within and/or one or more components of the aircraft passenger compartment suite 100 may be monitored by the one or more aircraft passenger compartment suite controllers 400 and/or the one or more aircraft controllers 410. For example, the movement of the passengers within the one or more aircraft passenger compartments 100a may be monitored. By way of another example, the actuation of the one or more aircraft seats 112 of the one or more aircraft passenger compartments 100a between the upright position and the lie-flat position may be monitored.

It is noted herein the monitoring of the passengers and/or the one or more components of the aircraft passenger compartment suite 100 may be used for predictive cabin service, a service for monitoring passengers to identify the needs of the passengers, analyze possible responses to the needs of the passengers, and allow crew members to be proactive in addressing the needs of the passengers. For example, the movement of the passengers may be monitored to determine whether the passengers are sitting, resting, waking, experiencing a medical issue or other distress, or the like to determine what needs the passengers may have following the monitored movement. By way of another example, the one or more components of the aircraft passenger compartment suite 100 may be monitored for correct component operation to determine potential component failure, determine potential needs of the passengers, or the like.

For instance, a possible failure of the aircraft seat 112 (e.g., due to interference with the one or more privacy shell elements 108, interference between the primary section 114 and the auxiliary section 116 of the aircraft seat 112, or the like) may be monitored. Predictive cabin service is described in greater detail in U.S. application Ser. No. 16/526,495, filed on Jul. 30, 2019, which is incorporated herein in the entirety.

The one or more processors 402, 412 may include any one or more processing elements known in the art. In this sense, the one or more processors 402, 412 may include any microprocessor device configured to execute algorithms and/or program instructions. In general, the term "processor" may be broadly defined to encompass any device having one or more processing elements, which execute a set of program instructions from a non-transitory memory medium (e.g., the memory 404, 414), where the one or more sets of program instructions 406, 416 are configured to cause the one or more processors 402, 412 to carry out any of one or more process steps.

The memory 404, 414 may include any storage medium known in the art suitable for storing the one or more sets of program instructions 406, 416 executable by the associated one or more processors 402, 412. For example, the memory 404, 414 may include a non-transitory memory medium. For instance, the memory 404, 414 may include, but is not limited to, a read-only memory (ROM), a random access memory (RAM), a magnetic or optical memory device (e.g., disk), a magnetic tape, a solid state drive, and the like. The memory 404, 414 may be configured to provide display information to the one or more display devices 420, 426. In addition, the memory 404, 414 may be configured to store user input information from the one or more user input devices 422, 428. The memory 404, 414 may be housed in a common controller housing with the one or more processors 402, 412. The memory 404, 414 may, alternatively or in addition, be located remotely with respect to the spatial location of the processors 402, 412, the one or more aircraft passenger compartment suite controllers 400 and/or the one or more aircraft controllers 410. For instance, the one or more processors 402, 412, the one or more aircraft passenger compartment suite controllers 400, and/or the one or more aircraft controllers 410 may access a remote memory 404, 414 (e.g., server), accessible through a network (e.g., internet, intranet, and the like) via one or more communication interfaces.

The one or more communication interfaces 408, 418 may be operatively configured to communicate with one or more components of the aircraft passenger compartment suite controller 400 and/or the one or more components of the aircraft controller 410. For example, the one or more communication interfaces 408, 418 may also be coupled (e.g., physically, electrically, and/or communicatively) with the one or more processors 402, 412 to facilitate data transfer between components of the one or more components of the aircraft passenger compartment suite controller 400 and/or the one or more components of the aircraft controller 410 and the one or more processors 402, 412. For instance, the one or more communication interfaces 408, 418 may be configured to retrieve data from the one or more processors 402, 412, or other devices, transmit data for storage in the memory 404, 414, retrieve data from storage in the memory 404, 414, or the like. By way of another example, the aircraft controller 410 and/or one or more offboard controllers may be configured to receive and/or acquire data or information from other systems or tools by a transmission medium that may include wireline and/or wireless portions. By way of another example, the aircraft controller 410 and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 410 and/or the one or more offboard controllers and the other subsystems (e.g., of the passenger aircraft 430 and/or the aircraft passenger compartment suite 100). In addition, the aircraft controller 410 and/or the one or more offboard controllers may be configured to send data to external systems via a transmission medium (e.g., network connection).

Although the present disclosure is directed to the one or more aircraft passenger compartment suite controllers 400 and the one or more aircraft controllers 410 being separate, it is noted herein the one or more aircraft passenger compartment suite controllers 400 and the one or more aircraft controllers 410 may be the same and/or share select components. Therefore, the above description should not be interpreted as a limitation on the present disclosure but merely an illustration.

The one or more display devices 420, 426 may include any display device known in the art. For example, the one or more display devices 420, 426 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 420, 426 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 422, 428 may include any user input device known in the art. For example, the one or more user input devices 422, 428 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 420, 426 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 420, 426 being indirectly coupled to the corresponding one or more user input devices 422, 428 indirectly (e.g., via the one or more aircraft passenger compartment suite controllers 400 and/or the one or more aircraft controllers 410), it is noted herein the one or more display devices 420, 426 may be directly coupled to the corresponding one or more user input devices 422, 428. For example, the one or more display devices 420, 426 may be housed with the one or more user input devices 422, 428 in a common user interface housing. Therefore, the above description should not be interpreted as a limitation on the present disclosure but merely an illustration.

It is noted herein that any embodiments directed to the display devices 402, 426 and/or the user input devices 422, 428 may be directed to IFEs installed within the aircraft passenger compartment suite 100. Therefore, the above description should not be interpreted as a limitation on the present disclosure but merely an illustration.

Although embodiments of the present disclosure illustrate the actuation of components of the aircraft passenger compartment suite 100 via the control unit 424 (e.g., where the components are driven via a motor), it is noted herein that one or more components of the aircraft seat 112 may be actuated by engaging a handle that activates one or more analog mechanical assemblies. Therefore, the above description should not be interpreted as a limitation on the scope of the disclosure but merely an illustration.

Although the present disclosure is directed to the aircraft passenger compartment suite 100 being installed in the passenger aircraft 430, it is noted herein the aircraft passenger compartment suite 100 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

It is noted herein that one or more components of the aircraft passenger compartment suite 100 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment suite, comprising:
a privacy shell element proximate to an aircraft seat installed within the aircraft passenger compartment suite, a first section of the privacy shell element being configured to conform to a primary section of the aircraft seat, a second section of the privacy shell element being configured to conform to an auxiliary section of the aircraft seat, the primary section positioned substantially parallel to the auxiliary section of the aircraft seat, where an edge of the primary section is substantially flush with an edge of the auxiliary section of the aircraft seat to form a combined area of the aircraft seat,
the privacy shell element including a first profile configured to conform with the aircraft seat when the aircraft seat is in a first position, the privacy shell element including a second profile configured to conform with the aircraft seat when the aircraft seat is in a second position,
the second profile of the privacy shell element being configured to occupy a greater amount of passenger aircraft living space surrounding the aircraft passenger compartment suite than an amount of passenger aircraft living space occupied by the first profile of the privacy shell element.

2. The aircraft passenger compartment suite of claim 1, the first position including an upright position.

3. The aircraft passenger compartment suite of claim 2, the primary section of the aircraft seat and the auxiliary section of the aircraft seat forming a wide seating area when the aircraft seat is in the upright position, the wide seating area configured to seat one or more passengers.

4. The aircraft passenger compartment suite of claim 3, the primary section of the aircraft seat being configured for a first passenger in the aircraft passenger compartment suite when the aircraft seat is in the upright position.

5. The aircraft passenger compartment suite of claim 4, the auxiliary section of the aircraft seat being configured for a second passenger in the aircraft passenger compartment suite when the aircraft seat is in the upright position.

6. The aircraft passenger compartment suite of claim 2, the first section of the privacy shell element being configured to conform to a seat back of the primary section of the aircraft seat when the aircraft seat is in the upright position, the second section of the privacy shell element being configured to conform to a seat back of the auxiliary section of the aircraft seat when the aircraft seat is in the upright position.

7. The aircraft passenger compartment suite of claim 6, the first profile of the privacy shell element including a first flat surface configured to conform to the seat back of the primary section of the aircraft seat when the aircraft seat is in the upright position, the first profile of the privacy shell element including a second flat surface configured to conform to the seat back of the auxiliary section of the aircraft seat when the aircraft seat is in the upright position.

8. The aircraft passenger compartment suite of claim 2, the second position including a lie-flat position.

9. The aircraft passenger compartment suite of claim 8, the primary section of the aircraft seat and the auxiliary section of the aircraft seat forming a wide lie-flat area when the aircraft seat is in the lie-flat position, the wide lie-flat area configured to provide increased width for a passenger when in the lie-flat position.

10. The aircraft passenger compartment suite of claim 9, the primary section of the aircraft seat and the auxiliary section of the aircraft seat being configured for a passenger in the aircraft passenger compartment suite when the aircraft seat is in the lie-flat position.

11. The aircraft passenger compartment suite of claim 9, the first section of the privacy shell element being configured to conform to a headrest of the primary section of the aircraft seat when the aircraft seat is in the lie-flat position, the second section of the privacy shell element being configured to conform to an edge of a seat back of the auxiliary section of the aircraft seat when the aircraft seat is in the lie-flat position.

12. The aircraft passenger compartment suite of claim 11, the second profile of the privacy shell element including a notch configured to conform to the headrest of the primary section of the aircraft seat when the aircraft seat is in the lie-flat position, the second profile of the privacy shell element including a surface configured to conform to the seat back of the auxiliary section of the aircraft seat when the aircraft seat is in the lie-flat position, the notch being configured to occupy the greater amount of passenger aircraft living space surrounding the aircraft passenger compartment suite than the amount of passenger aircraft living space occupied by the surface configured to conform to the seat back of the auxiliary section of the aircraft seat.

13. The aircraft passenger compartment suite of claim 11, a portion of the auxiliary section of the aircraft seat being coupled to the privacy shell element when the auxiliary section of the aircraft seat transitions between the upright position and the lie-flat position.

14. The aircraft passenger compartment suite of claim 8, the aircraft seat being configured to be positioned within a reclined position, the aircraft seat being configured to transition from the upright position to the lie-flat position through the reclined position.

15. A passenger compartment aircraft suite system, comprising:
 a first aircraft passenger compartment suite, comprising:
  a first privacy shell element proximate to a first aircraft seat installed within the first aircraft passenger compartment suite, a first section of the first privacy shell element being configured to conform to a primary section of the first aircraft seat, a second section of the first privacy shell element being configured to conform to an auxiliary section of the first aircraft seat, the primary section positioned substantially parallel to the auxiliary section of the aircraft seat, where an edge of the primary section is substantially flush with an edge of the auxiliary section of the aircraft seat to form a combined area of the aircraft seat,
  the first privacy shell element including a first profile configured to conform with the first aircraft seat when the first aircraft seat is in a first position, the first privacy shell element including a second profile configured to conform with the first aircraft seat when the first aircraft seat is in a second position,
  the second profile of the first privacy shell element being configured to occupy a greater amount of passenger aircraft living space surrounding the first aircraft passenger compartment suite than an amount of passenger aircraft living space occupied by the first profile of the first privacy shell element; and
 a second aircraft passenger compartment suite, comprising:
  a second privacy shell element proximate to a second aircraft seat installed within the second aircraft passenger compartment suite, a first section of the second privacy shell element being configured to conform to a primary section of the second aircraft seat, a second section of the second privacy shell element being configured to conform to an auxiliary section of the second aircraft seat,
  the second privacy shell element including a first profile configured to conform with the aircraft seat when the aircraft seat is in a first position, the second privacy shell element including a second profile configured to conform with the aircraft seat when the aircraft seat is in a second position,
  the second profile of the second privacy shell element being configured to occupy a greater amount of passenger aircraft living space surrounding the second aircraft passenger compartment suite than an amount of passenger aircraft living space occupied by the first profile of the second privacy shell element,
 the first aircraft passenger compartment suite being positioned proximate to the second aircraft passenger compartment suite within the passenger aircraft living space, the first privacy shell element of the first aircraft passenger compartment suite being configured to engage the second privacy shell element of the second aircraft passenger compartment suite.

* * * * *